(12) United States Patent
Isoda et al.

(10) Patent No.: US 7,311,170 B2
(45) Date of Patent: Dec. 25, 2007

(54) ALL TERRAIN VEHICLE

(75) Inventors: Takashi Isoda, Shizuoka (JP); Masayuki Uchiyama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 440 days.

(21) Appl. No.: 11/142,598

(22) Filed: Jun. 1, 2005

(65) Prior Publication Data
US 2006/0272873 A1 Dec. 7, 2006

(51) Int. Cl.
*B60K 13/04* (2006.01)
(52) U.S. Cl. ............... 180/296; 180/291; 180/68.5
(58) Field of Classification Search ......... 180/291, 180/296, 68.5, 357, 350; 280/833
See application file for complete search history.

(56) References Cited

U.S. PATENT DOCUMENTS

| | | | | |
|---|---|---|---|---|
| 4,757,872 A | * | 7/1988 | Inomata | 180/291 |
| 5,064,016 A | * | 11/1991 | Iwai et al. | 180/215 |
| 6,230,833 B1 | * | 5/2001 | Setsuda | 180/68.5 |
| 6,357,542 B1 | * | 3/2002 | Sako | 180/68.5 |
| 7,216,733 B2 | * | 5/2007 | Iwami et al. | 180/68.1 |
| 7,232,171 B2 | * | 6/2007 | Lan et al. | 296/37.1 |
| 2002/0023792 A1 | * | 2/2002 | Bouffard et al. | 180/68.4 |
| 2002/0088661 A1 | * | 7/2002 | Gagnon et al. | 180/248 |

FOREIGN PATENT DOCUMENTS

| | | |
|---|---|---|
| JP | 59-170018 U | 11/1984 |
| JP | 2005-001508 | 1/2005 |

* cited by examiner

*Primary Examiner*—Christopher P. Ellis
*Assistant Examiner*—Vaughn Coolman
(74) *Attorney, Agent, or Firm*—Keating & Bennett, LLP

(57) ABSTRACT

An all terrain vehicle is capable of preventing the temperature of air supplied to an engine and the temperature of a battery from being excessively increased and has a large minimum ground clearance. An object-mountable supporting box is bridged between left and right frame members of a body frame. A battery is located above a bottom plate of the supporting box. An air cleaner is located between the left and right frame members and rearward relative to the supporting box. An intake passage is located in an area which is between the left and right frame members, above the bottom plate of the supporting box, and beside the battery. An exhaust passage passes through an area above a bottom of the frame body and below the bottom plate of the supporting box.

18 Claims, 10 Drawing Sheets

ALL TERRAIN VEHICLE

BACKGROUND OF THE INVENTION

1. Field of the Invention

The present invention relates to an all terrain vehicle, and more specifically, to an all terrain vehicle including a battery and an air cleaner mounted rearward relative to an engine.

2. Description of the Related Art

One conventional type of an all terrain vehicle described in, for example, Japanese Laid-Open Utility Model Publication No. 59-170018 has the following arrangement of an air cleaner and a battery. The battery is provided at the center or the vicinity thereof in a forward-rearward direction of a body frame, and an air cleaner is provided rearward relative to the battery. An engine mounted in a front portion of the body frame and the air cleaner are operatively connected with each other via an intake duct.

When providing an exhaust system for the engine, it is necessary to prevent the temperature of air supplied to the engine or the temperature of the battery from being excessively increased by the heat of exhaust gas flowing in an exhaust passage. When the temperature of the air is excessively increased, the charging efficiency is reduced. When the temperature of the battery is excessively increased, the life of the battery is shortened.

In the above-described conventional all terrain vehicle, such problems caused by the heat are considered to be avoided because the exhaust pipe is arranged to pass below a crank case of the engine.

However, in the above-described structure where the exhaust pipe is arranged to pass below the crank case of the engine as in the conventional all terrain vehicle, the distance from the ground surface, i.e., the so-called the minimum ground clearance, is reduced. As a result, the exhaust pipe may be damaged by protrusions on the ground. Especially for an all terrain vehicle, which often runs on the ground with many protrusions, it is desirable to obtain a maximum possible distance from the ground.

SUMMARY OF THE INVENTION

In order to overcome the problems described above, preferred embodiments of the present invention provide an all terrain vehicle capable of preventing the temperature of air supplied to an engine and the temperature of a battery from being excessively increased and also capable of obtaining a large minimum ground clearance.

An all terrain vehicle according to a preferred embodiment of the present invention includes a body frame including a left frame member and a right frame member extending in a longitudinal direction of the all terrain vehicle, a seat mounted on the body frame, an engine mounted in a front portion of the body frame, a battery and an air cleaner mounted rearward relative to the engine, an intake passage for connecting the air cleaner and the engine, an exhaust passage connected to the engine, and an object-mountable supporting box having a bottom plate and bridged between the left frame member and the right frame member. The battery is located above the bottom plate of the supporting box. The air cleaner is located between the left and right frame members and rearward relative to the supporting box. The intake passage is located in an area which is between the left and right frame members, above the bottom plate of the supporting box, and beside the battery in a width direction of the all terrain vehicle. The exhaust passage is provided so as to pass through an area which is above a bottom of the frame body and below the bottom plate of the supporting box.

According to this preferred embodiment of the all terrain vehicle of the present invention, the battery and the intake passage are located adjacent to each other in the width direction of the all terrain vehicle, above the bottom plate of the object-mountable supporting box which is bridged between the left frame member and the right frame member of the body frame. The exhaust passage is provided below the bottom plate of the object-mountable supporting box. Therefore, the object-mountable supporting box acts as a heat shielding member that blocks or shields heat emitted from the exhaust passage. As a result, the temperature of the air supplied to the engine and the temperature of the battery are prevented from being excessively increased by the heat of the exhaust gas in the exhaust passage.

Since the object-mountable supporting box acts as a heat shielding member, it is possible to provide the exhaust passage at a higher position than the bottom of the body frame, i.e., closer to the battery and the intake passage, while avoiding the problems caused by the heat as mentioned above. In other words, unlike in the conventional structure, the exhaust passage does not need to be located below the body frame. Therefore, a sufficient minimum ground clearance can be guaranteed and thus damages to the exhaust passage can be avoided even on a rough terrain.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Hereinafter, the present invention will be described by way of preferred embodiments with reference to the attached drawings.

FIG. 1 through FIG. 11 are views illustrating an all terrain vehicle according to preferred embodiments of the present invention. In the present preferred embodiment, the terms "front", "forward", "rear", "rearward", "left", "right", "behind" and "side" refer to directions from the point of view of a rider sitting on a seat of the all terrain vehicle.

Figure 1:
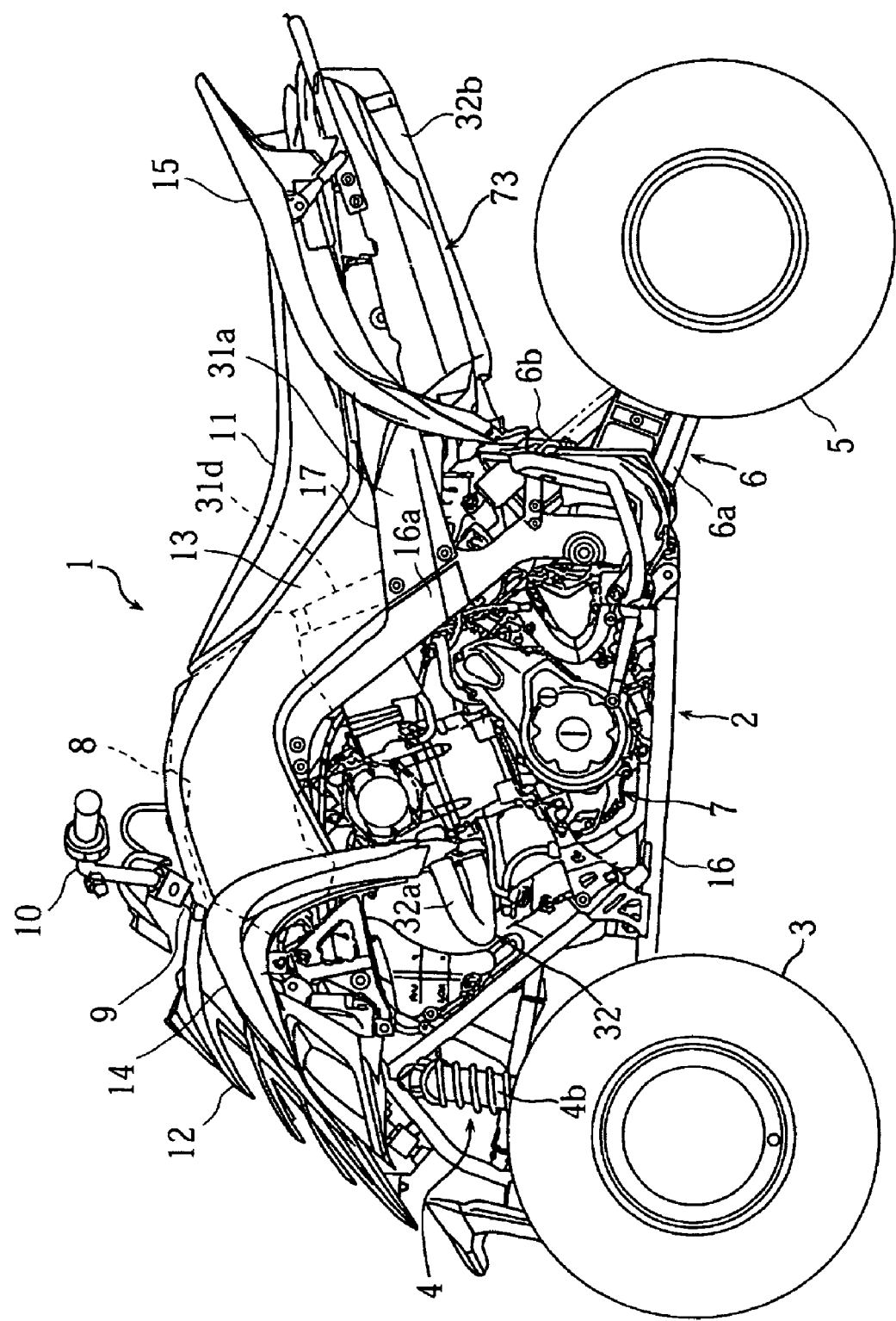
FIG. 1 is a side view of an all terrain vehicle according to a preferred embodiment of the present invention.
Figure 2:
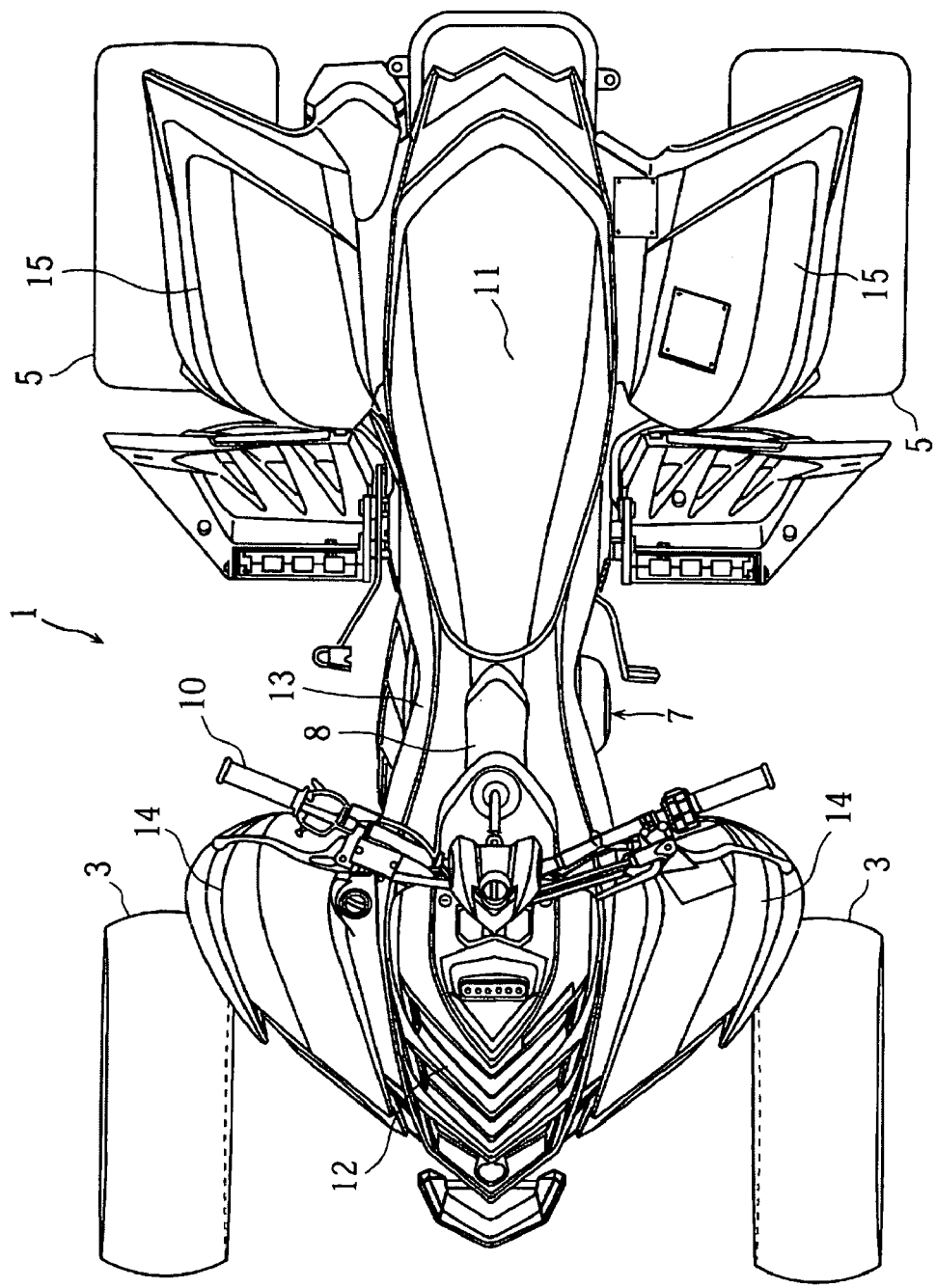
FIG. 2 is a plan view of the all terrain vehicle shown in FIG. 1.

In FIG. 1 through FIG. 11, reference numeral 1 represents an all terrain vehicle according to the present preferred embodiment. The all terrain vehicle 1 generally has the following structure. With reference to FIG. 1 and FIG. 2, the all terrain vehicle 1 preferably includes a double-cradle type body frame 2. By left and right ends of a front edge of the body frame 2, left and right front wheels 3 are respectively supported via left and right front suspension devices 4, so as to be swingable upward and downward. Each front wheel 3 preferably has a balloon tire having a low air pressure and has a large width. By left and right ends of a rear edge of the body frame 2, left and right rear wheels 5 similar to the front wheels 3 are respectively supported via a rear suspension device 6, so as to be swingable upward and downward. In the cradle of the body frame 2, an engine unit 7 is mounted. Above the engine unit 7, a fuel tank 8 is mounted. Forward of the fuel tank 8, a steering shaft 9 for steering the left and right front wheels 3 is provided so as to be pivotable rightward and leftward. A steering handle 10 is fixed to a top end of the steering shaft 9. Rearward of the fuel tank 8, a seat 11 is provided. A front portion of the steering shaft 9 is covered with a front cover 12. Left and right portions of the fuel tank 8 and lower left and right portions of the seat 11 are covered with side covers 13. Above the left and right front wheels 3, left and right front fenders 14 are provided. Above the left and right rear wheels 5, left and right rear fenders 15 are provided.

Figure 3:
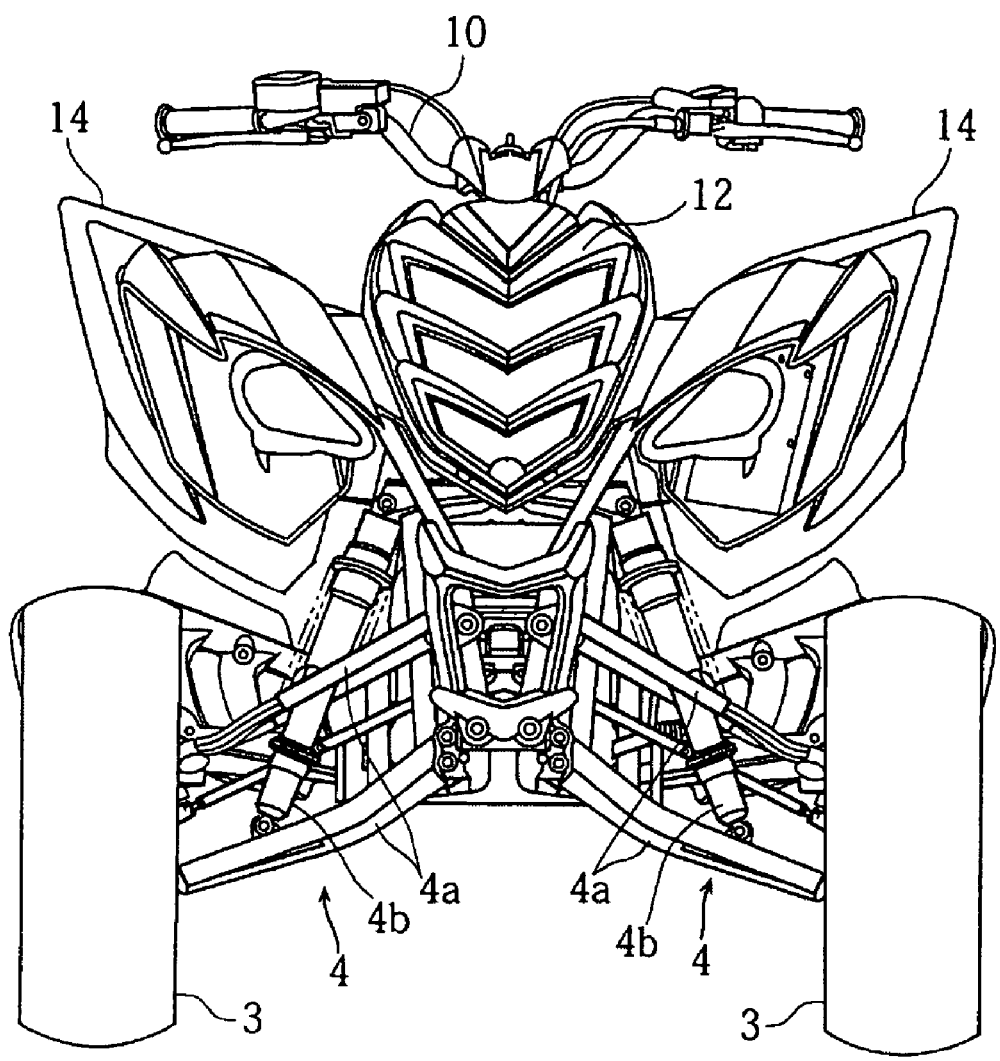
FIG. 3 is a front view of the all terrain vehicle shown in FIG. 1.

As shown in FIG. 3, each front suspension device 4 includes top and bottom front arms 4a and a cushion unit 4b. The top and bottom front arms 4a are supported by a front portion of the body frame 2 so as to be swingable upward and downward, and support the corresponding front wheel 3. The cushion unit 4b is provided between the bottom front arm 4a and the body frame 2.

Figure 4:
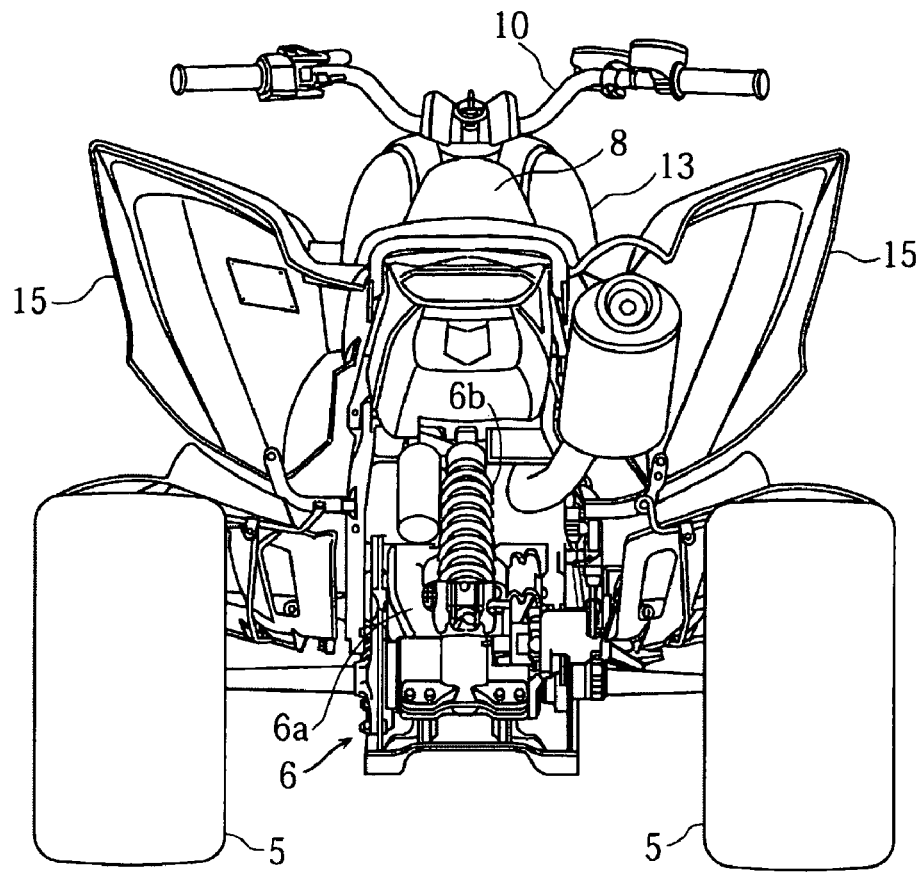
FIG. 4 is a rear view of the all terrain vehicle shown in FIG. 1.

As shown in FIG. 4, the rear suspension device 6 includes a rear arm 6a and a cushion unit 6b. The rear arm 6a is supported by a rear portion of the body frame 2 so as to be swingable upward and downward, and supports the rear wheels 5. The cushion unit 6b is provided between the rear arm 6a and the body frame 2, and is located approximately at the center in a width direction of the all terrain vehicle 1. In this specification, the "width direction" is a direction that is substantially parallel to the phantom straight line connecting the centers of the left and right front wheels 3 or the centers of the left and right rear wheels 5. The "longitudinal direction" is a horizontal direction that is substantially perpendicular to the width direction.

Figure 10:
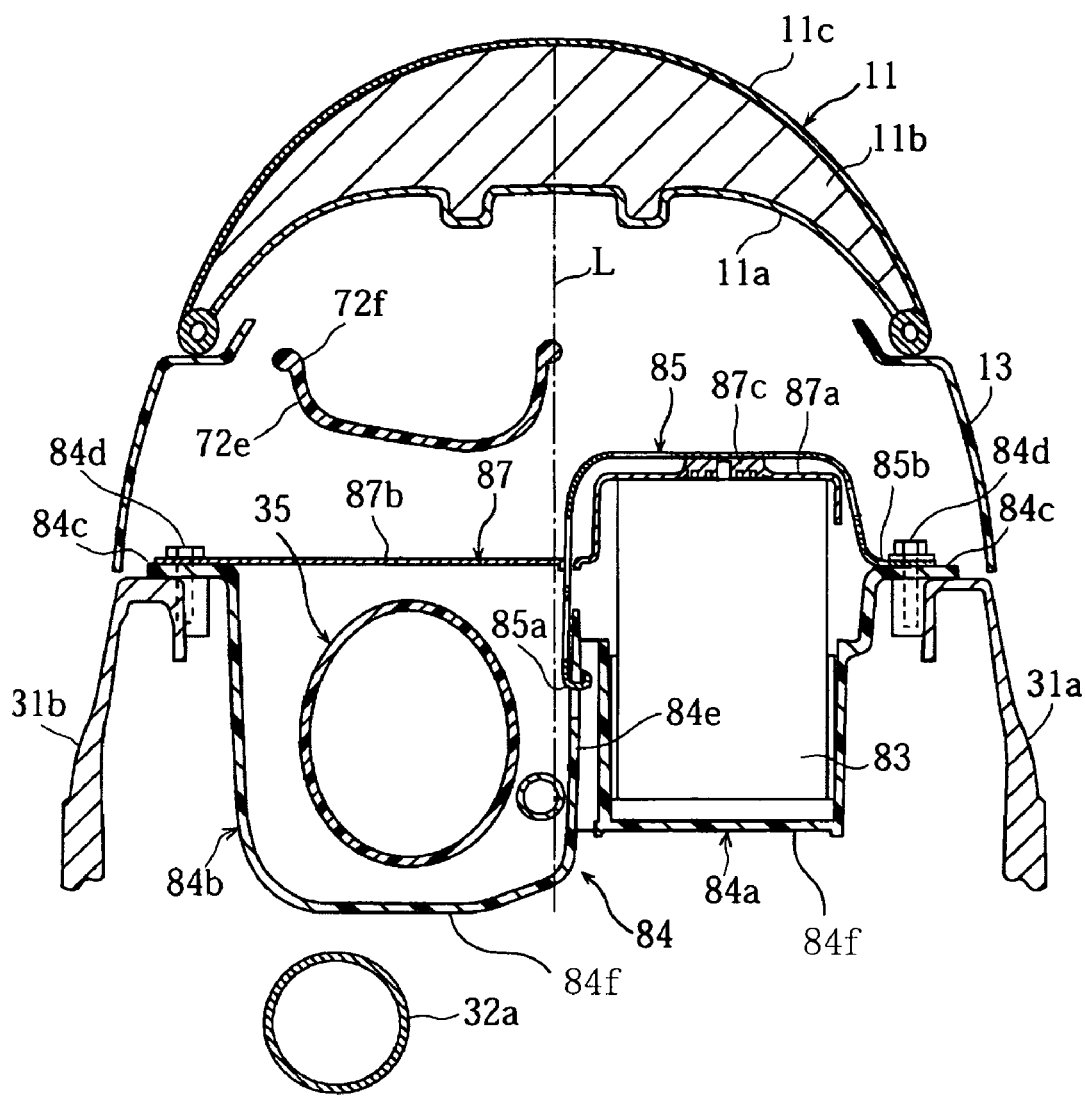
FIG. 10 is a cross-sectional view illustrating the arrangement of the intake system, the battery and the exhaust system taken along line X-X of FIG. 9 and seen from the front.

The seat 11 has the following structure. As best shown in FIG. 10, a cushion material 11b is provided on a bottom plate 11a. The cushion material 11b is covered with a surface layer 11c, and a periphery of the surface layer 11c is fixed to a periphery of the bottom plate 11a. As shown in FIG. 6, a front portion 11a' of the bottom plate 11a of the seat 11 inclines upward, and a table portion 11d is formed in the vicinity of a front edge of the front portion 11a'. The table portion 11d is supported by supporting bosses (seat receiving portions) 31e (FIG. 5) of the body frame 2 described later.

Returning to FIG. 1, the body frame 2 includes a main frame 16 for supporting the engine unit 7, the front suspension devices 4 and the rear suspension device 6, and a seat rail 17 attached to the main frame 16 for supporting the seat 11.

The seat rail 17 is provided for bearing the load acting on the seat 11, for example, the body weight of the rider. The seat rail 17 is detachably provided on rear arm supporting sections 16a of the main frame 16.

Figure 5:
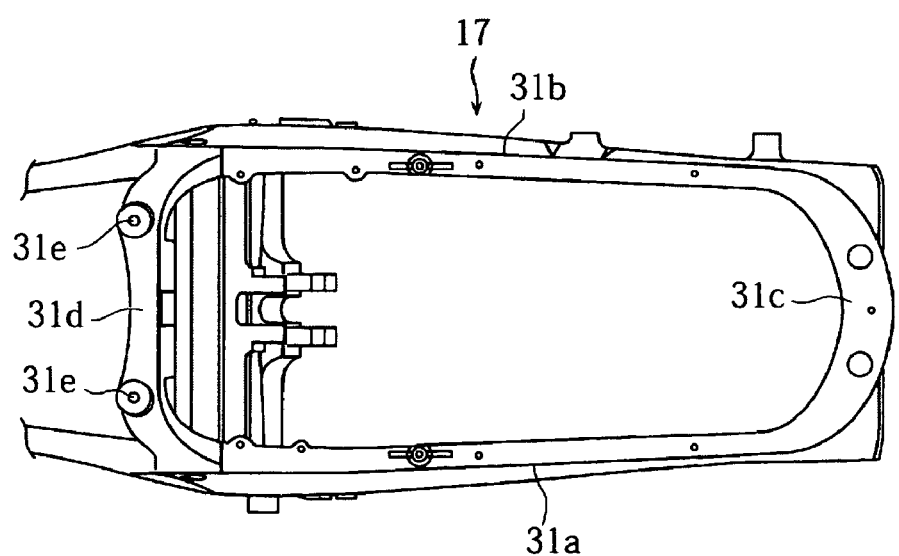
FIG. 5 is plan view of a seat rail of the all terrain vehicle shown in FIG. 1.
Figure 6:
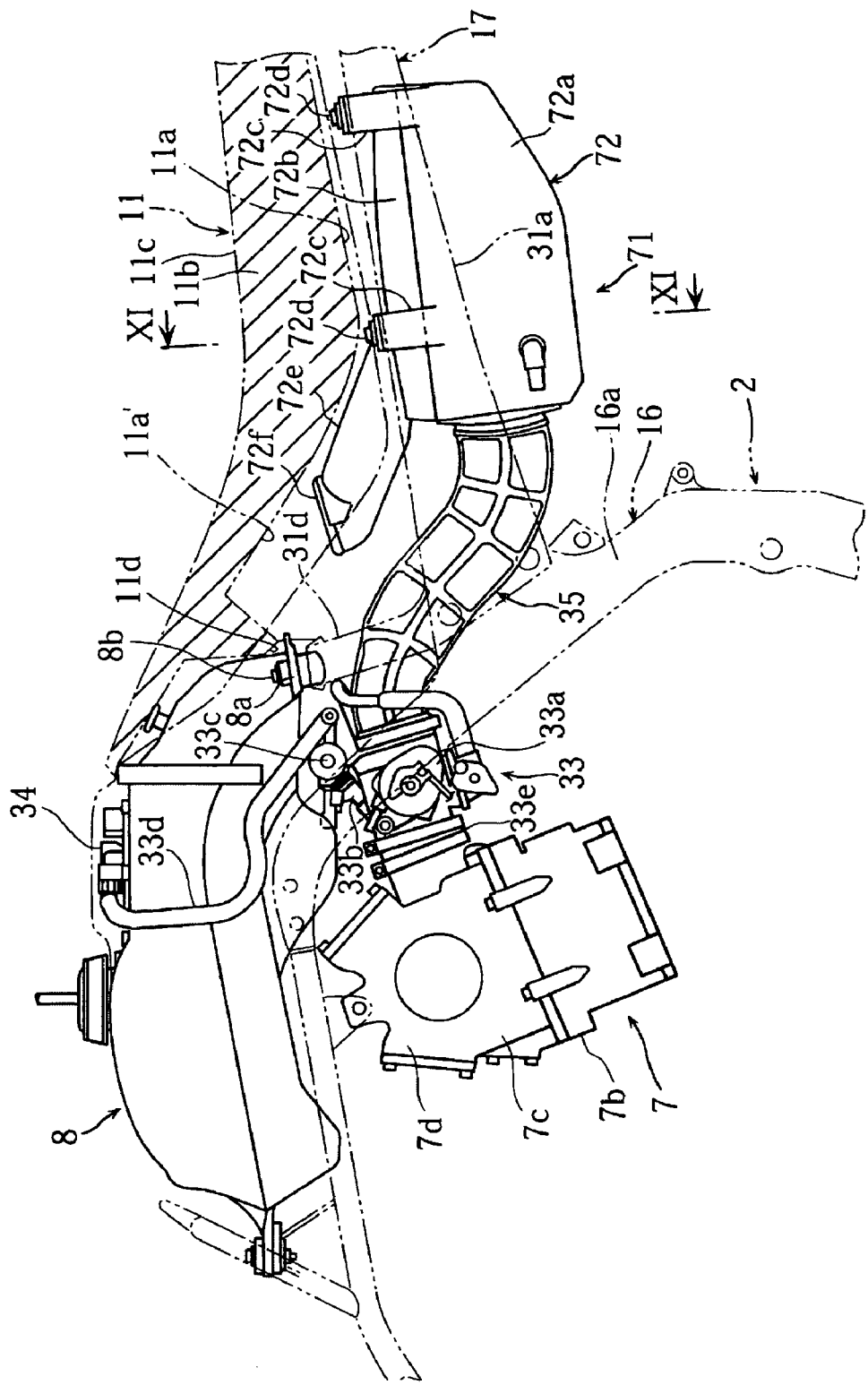
FIG. 6 is a side view of an intake system and the vicinity thereof of the all terrain vehicle shown in FIG. 1.

The seat rail 17 is preferably molded of an aluminum alloy, and preferably has a generally rectangular shape when viewed from above as best shown in FIG. 5. The seat rail 17 includes a left rail main body 31a (left frame member) and a right rail main body 31b (right frame member) both extending in the longitudinal direction, a rear portion 31c for connecting rear ends of the left and right rail main bodies 31a and 31b, and a front portion 31d for connecting front ends of the left and right rail main bodies 31a and 31b. The front portion 31d is curved so as to protrude upward like a gate. On a top surface of the front portion 31d, the supporting bosses 31e are arranged to support a rear portion of the fuel tank 8 and the table portion 11d of the seat 11.

In more detail, as shown in FIG. 6, a flange 8a located at a rear end of the fuel tank 8 is tightened and fixed to the supporting bosses 31e by bolts 8b (only one bolt 8b is shown in FIG. 6). The table portion 11d of the seat 11 is supported by the supporting bosses 31e in the state of holding a front extension portion 87d of a cover sheet 87 (FIG. 9) described later.

As best shown in FIG. 6, the engine unit 7 includes a crank case for accommodating a crank shaft, and a cylinder block 7b, a cylinder head 7c and a head cover 7d which are stacked on a top wall of a front portion of the crank case. The crank case, the cylinder block 7b, the cylinder head 7c, and the head cover 7d are tightened to each other by bolts, for example.

A front wall of the cylinder head 7c has an exhaust port, and an exhaust pipe (exhaust passage) 32a (FIG. 1) of an exhaust system 32 is connected to the exhaust port. The exhaust pipe 32a extends forward, is bent right-rearward, passes on the right of the cylinder block 7b, and extends rearward below the right rail main body 31b of the seat rail 17.

Figure 8:
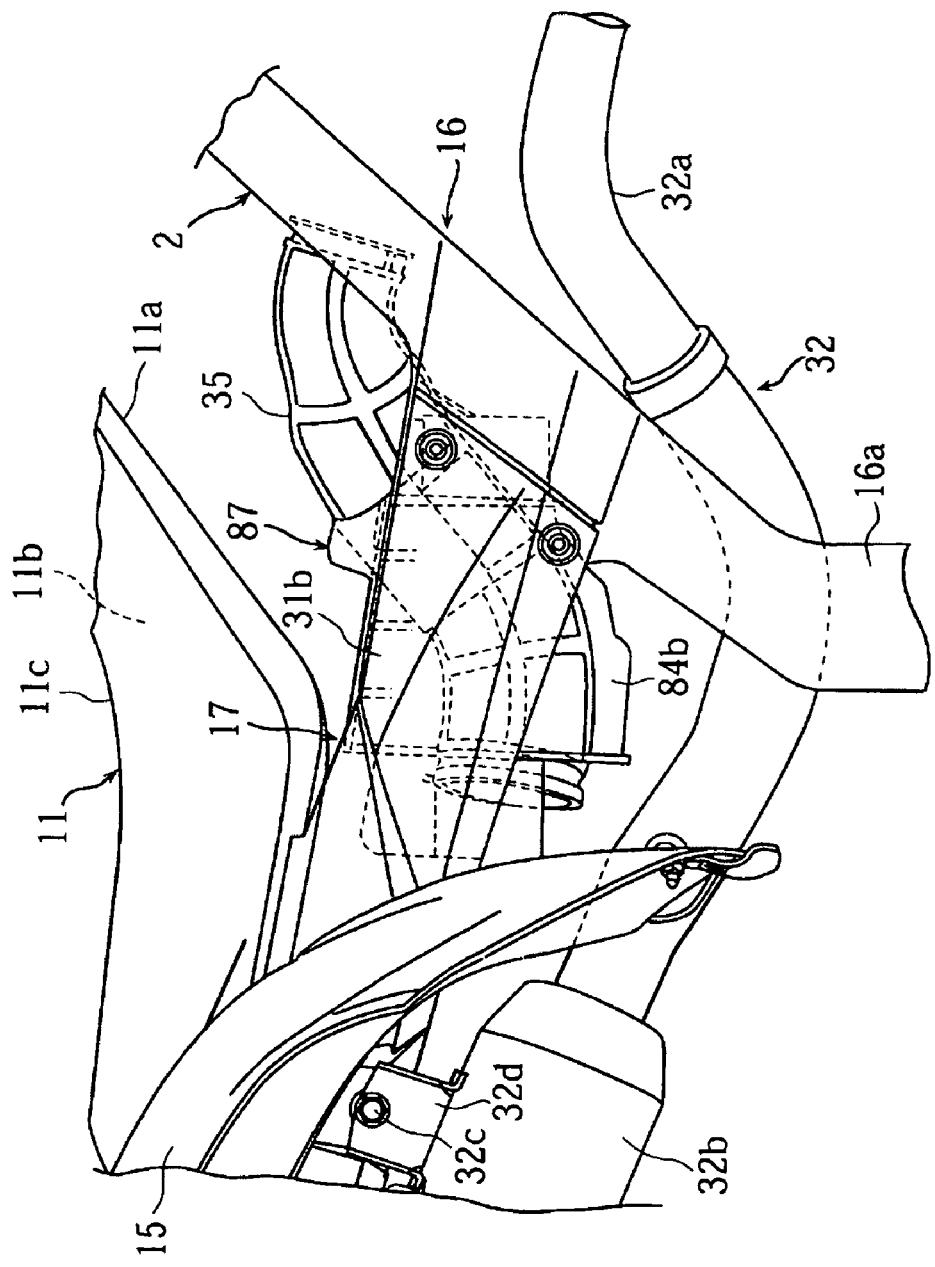
FIG. 8 is a right side view illustrating the arrangement of the intake system and an exhaust system of the all terrain vehicle shown in FIG. 1.

As best shown in FIG. 8, a muffler 32b having a larger diameter than that of the exhaust pipe 32a is connected to a rear end of the exhaust pipe 32a. The muffler 32b passes below the right rear fender 15 and extends along the right rail main body 31b. The muffler 32b is fixed to the right rail main body 31b by a bolt 32c via a bracket 32d.

As best shown in FIG. 6, a rear wall of the cylinder head 7c has an intake port, and a throttle body 33a of an intake system 33 is attached to the intake port via a joint member 33e. In the throttle body 33a, a throttle valve is provided for controlling the dimensional area of an intake passage. On a top wall of the throttle body 33a, a fuel injection valve 33b is provided. In more detail, the fuel injection valve 33b is provided on the top wall of the throttle body 33a so as to incline upward and rearward. The fuel injection valve 33b injects the fuel toward the intake port. A fuel supply rail 33c extending generally horizontally in the width direction of the all terrain vehicle 1 is connected to a fuel introduction opening at a top end of the fuel injection valve 33b. One end of the fuel supply rail 33c is connected to a discharge opening of a fuel supply pump 34 provided in the fuel tank 8 via a fuel supply hose 33d.

A portion of a bottom wall of the fuel tank 8 which corresponds to a bottom end of the fuel supply pump 34 protrudes downward. The protruding portion is located in a space defined by the head cover 7d of the engine unit 7, the throttle body 33a, and fuel injection valve 33b and the like.

An air cleaner 71 is connected to the throttle body 33a via an intake duct (intake passage) 35. The air cleaner 71 is provided below the seat 11. The air cleaner 71 preferably is a generally parallelepiped box formed of a resin. The air cleaner 71 includes an air cleaner case 72 and a filtering element (not shown) provided in the air cleaner case 72.

Figure 11:
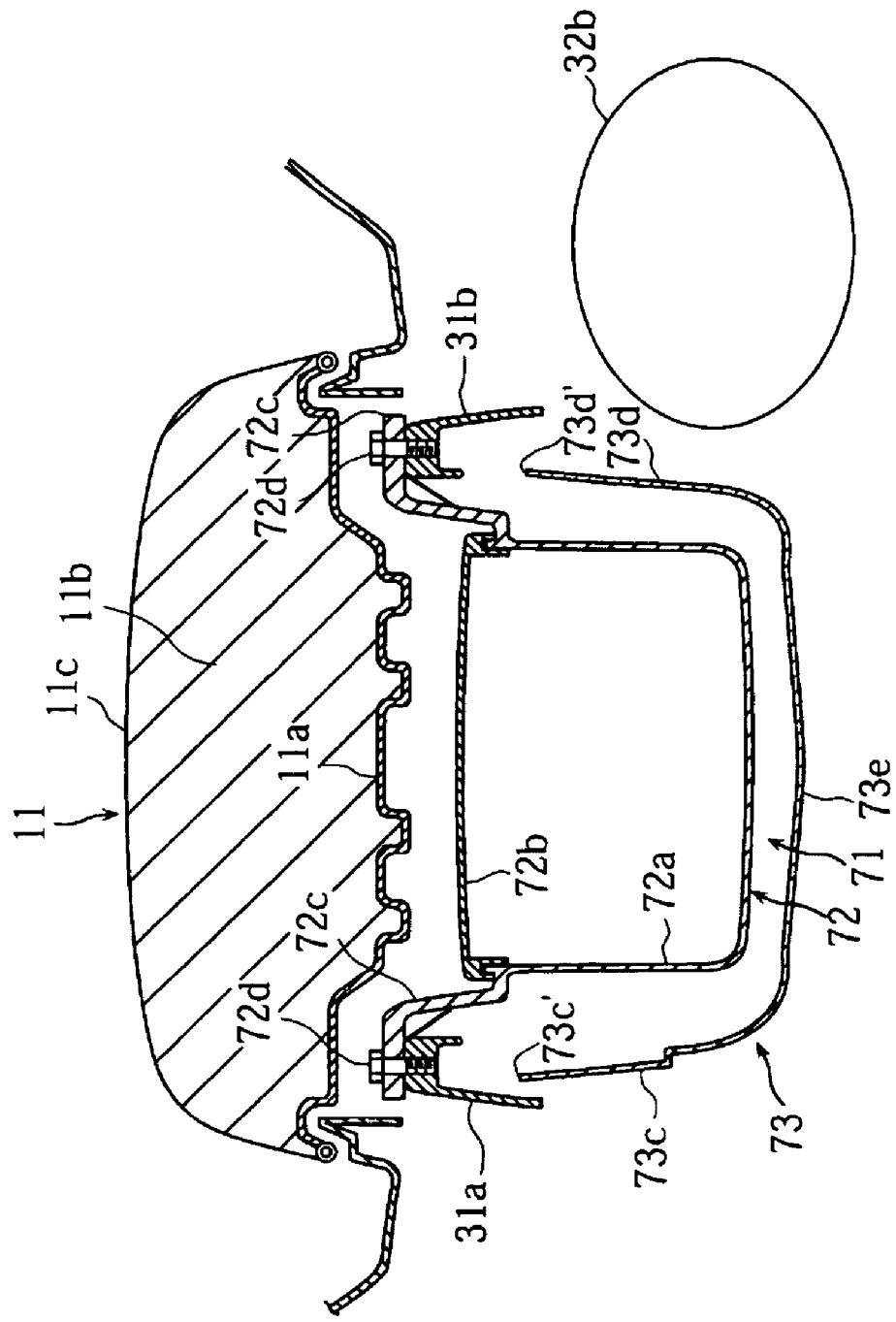
FIG. 11 is a cross-sectional view illustrating the arrangement of the air cleaner taken along line XI-XI of FIG. 6 and seen from behind.

As best shown in FIG. 11, the air cleaner case 72 includes a case main body 72*a* defining a lower portion and a case lid 72*b* defining an upper portion. On left and right side walls of the case main body 72*a*, flanges 72*c* extending upward and then outward are respectively provided. The flanges 72*c* are preferably integrally formed with the case main body 72*a*. The flanges 72*c* are placed on the left and right rail main bodies 31*a* and 31*b* respectively and are fixed to the left and right rail main bodies 31*a* and 31*b* by bolts 72*d*.

An undercover 73 is provided below the air cleaner 71. The undercover 73 includes left and right wall portions 73*c* and 73*d* for covering left and right surfaces of the air cleaner 71, and a bottom wall portion 73*e* for covering a bottom surface of the air cleaner 71. Top edges 73*c*' and 73*d*' of the left and right wall portions 73*c* and 73*d* of the undercover 73 are mostly inside the left and right rail main bodies 31*a* and 31*b* of the seat rail 17. When viewed from the side, the top edges 73*c*' and 73*d*' overlap the left and right rail main bodies 31*a* and 31*b*.

An air introduction duct 72*e* (FIG. 6) is preferably integrally formed with the case lid 72*b*. As shown in FIG. 6, the air introduction duct 72*e* extends upward and forward obliquely from the case lid 72*d*. In more detail, the air introduction duct 72*e* extends forward obliquely along the front portion 11*a*', which inclines upward and forward obliquely, of the bottom plate 11*a* of the seat 11. An opening 72*f* of the air introduction duct 72*e* is located at about the same height as a top surface of the engine unit 7.

Figure 7:
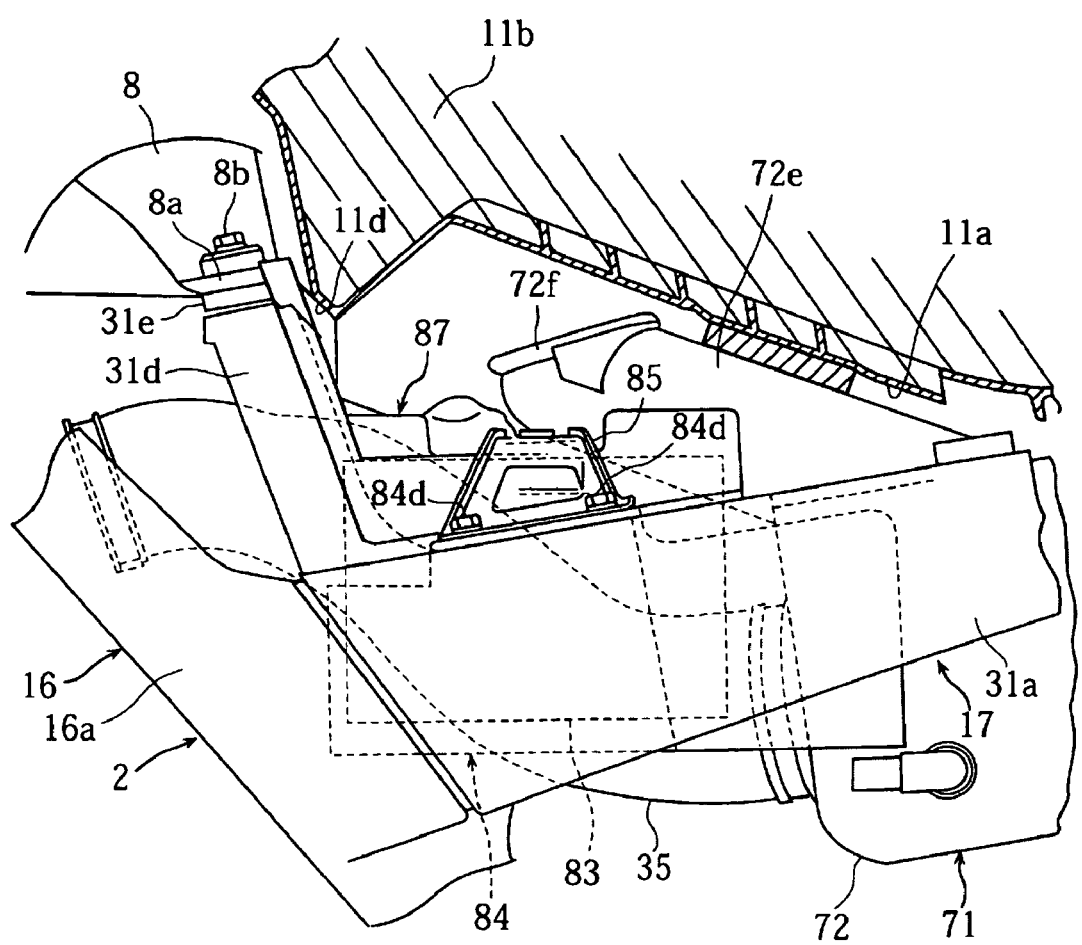
FIG. 7 is a left side view illustrating an arrangement of the intake system and a battery of the all terrain vehicle shown in FIG. 1.

The intake duct 35 is preferably formed of a resin or rubber, and is slowly bent downward from the throttle body 33*a* and then is bent rearward as shown in FIG. 7 and FIG. 8. The intake duct 35 is located between the left and right rail main bodies 31*a* and 31*b* when viewed from the front of the all terrain vehicle 1 (FIG. 10). A portion of the intake duct 35 which is located in an upper portion of an object-mountable supporting box 84 described below is located on the right of the center line L of the all terrain vehicle 1 in the width direction, when viewed from above.

Figure 9:
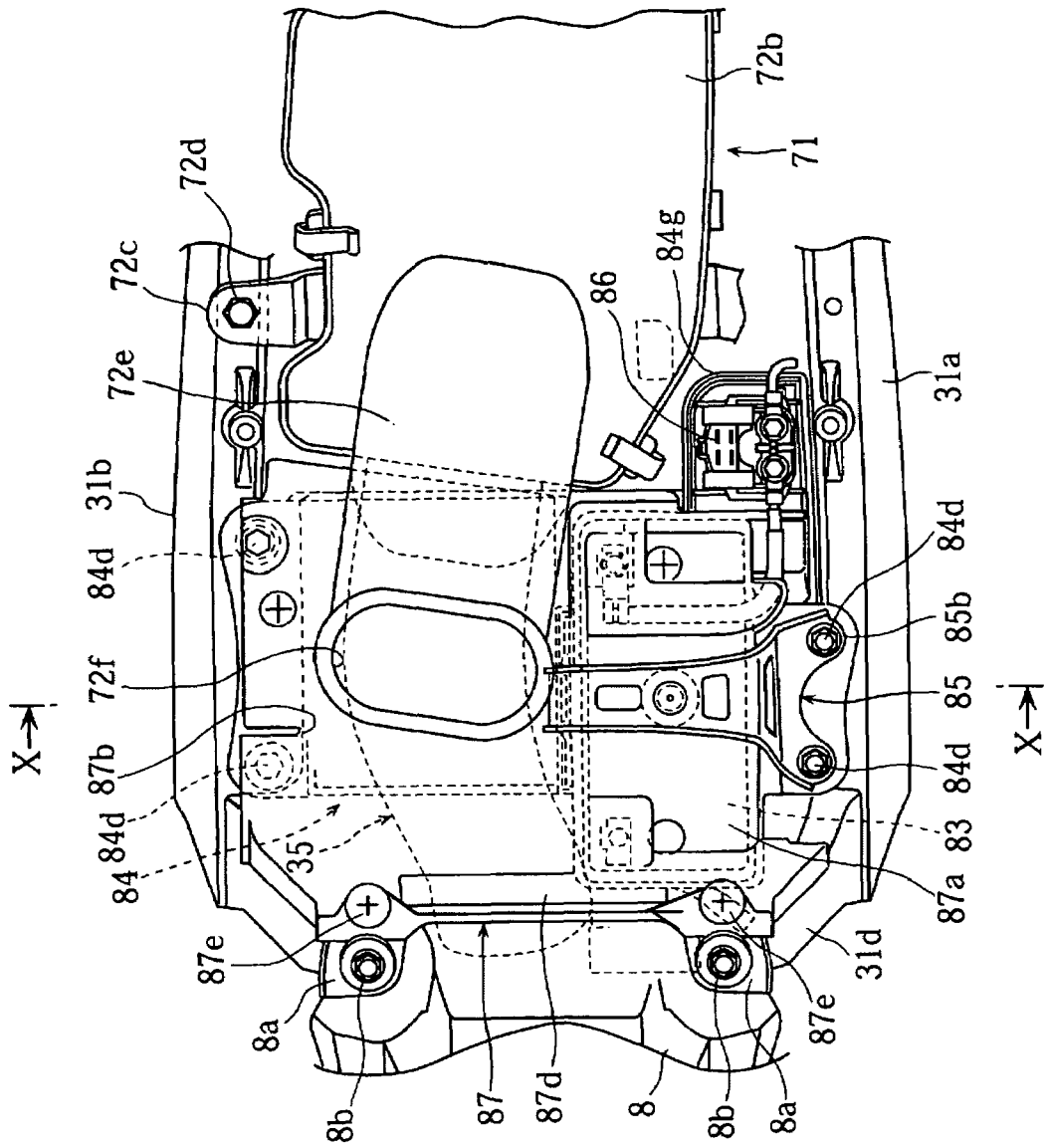
FIG. 9 is a plan view illustrating the arrangement of the intake system and the battery of the all terrain vehicle shown in FIG. 1.

As best shown in FIG. 9, the object-mountable supporting box 84 is bridged between the left and right rail main bodies 31*a* and 31*b*. The object-mountable supporting box 84 is preferably formed of a resin. As shown in FIG. 10, the supporting box 84 is formed by integrally molding a battery supporting portion 84*a* located on the right of the center line L and an intake passage accommodating portion 84*b* located on the left of the center line L. Flanges 84*c* formed on left and right edges of the supporting box 84 are placed on the left and right rail main bodies 31*a* and 31*b*, respectively, and tightened and fixed thereto by bolts 84*d*.

The battery supporting portion 84*a* has a box shape which is open at an upper portion thereof, and has a battery 83 accommodated therein. The intake passage accommodating portion 84*b* has a U-shaped cross-section in the width direction of the all terrain vehicle 1. Front and rear ends of the intake passage accommodating portion 84*b* are open, so as to guarantee a flow of moving air throughout the intake passage accommodating portion 84*b*. The intake duct 35 is located in the intake passage accommodating portion 84*b*. The battery supporting portion 84*a* and the intake passage accommodating portion 84*b* each include a bottom plate 84*f*.

As shown in FIG. 9, a box-shaped object-mountable portion 84*g*, separate from the battery supporting portion 84*a*, is integrally formed with, and located rearward relative to, the battery supporting portion 84*a*. In the object-mountable portion 84*g*, a starter relay 86 is mounted.

Because of the location of the object-mountable portion 84*g* being close to the battery supporting portion 84*a*, large volume electric components including the starter relay 86 can be mounted with a simple and easy attaching arrangement and also can be connected to the battery 83 with a short line with a simple arrangement.

The air cleaner 71 is located between the left and right rail main bodies 31*a* and 31*b* and rearward relative to the supporting box 84. The intake duct 35 is located between the left and right rail main bodies 31*a* and 31*b* and adjacent to the battery 83 in the width direction of the all terrain vehicle 1. Since the battery 83 is located between the air cleaner 71 and the engine unit 7 in the longitudinal direction of the all terrain vehicle 1, the battery 83 as a heavy component can be located close to the engine unit 7.

As best shown in FIG. 10, the supporting box 84 is covered with the cover sheet 87. The cover sheet 87 is preferably formed of rubber or the like, and is elastic and insulating. The cover sheet 87 includes a battery cover portion 87*a* for covering a top surface of the battery 83 and an intake duct cover portion 87*b* for covering a top opening of the intake passage accommodating portion 84*b*.

The intake duct cover portion 87*b* and the intake passage accommodating portion 84*b* define a cylinder extending in the longitudinal direction of the all terrain vehicle 1. The intake duct 35 is located in the cylinder, so that the moving air can flow around the intake duct 35. The intake duct cover portion 87*b* of the cover sheet 87 is located between the intake duct 35 and the air introduction duct 72*e*.

As best shown in FIG. 7, the battery 83 is fixed to the body frame 2 via a fixing bracket 85 provided on the battery cover portion 87*a* (FIG. 10). In more detail, as shown in FIG. 10, the fixing bracket 85 has a generally L-shaped cross section and is preferably formed of sheet metal. One end 85*a* of the fixing bracket 85 is engaged with an inner vertical wall 84*e* of the intake passage accommodating portion 84*b*. The other end 85*b* of the fixing bracket 85 is fixed to the left rail main body 31*a* by the bolt 84*d*. As a result, a projecting portion 87*c* of the cover sheet 87 presses and fixes the battery 83 to a bottom wall of the battery supporting portion 84*a*. The battery 83 is thus fixed by the cover sheet 87 located between the battery 83 and the fixing bracket 85 and does not vibrate.

The cover sheet 87 includes the front extension portion 87*d* (FIG. 9) extending forward from the battery cover portion 87*a* and the intake duct cover portion 87*b*. At left and right ends of the front extension portion 87*d*, held portions 87*e* are provided. The held portions 87*e* are held between the seat receiving portions 31*e* and the table portion (pressing portion) 11*d* of the bottom plate 11*a* of the seat 11.

The exhaust pipe 32*a* of the exhaust system 32 is arranged so as to bend rightward from the front wall of the cylinder head 7*c*, pass on the right of the cylinder head 7*c*, and pass through an area which is between the left and right rear arm supporting sections 16*a* of the body frame 2 and below the intake passage accommodating portion 84*b* of the supporting box 84 (FIG. 10). More specifically, the exhaust pipe 32*a* is located on the opposite side of the center line L from the battery 83 in the width direction of the all terrain vehicle 1. A portion of the exhaust pipe 32*a* which is located below the intake duct 35 is formed to be bent to be substantially parallel to the intake duct 35 as shown in FIG. 8.

In the all terrain vehicle 1 in this preferred embodiment, the battery 83 is provided in a left side portion of the object-mountable supporting box 84 bridged between the left and right rail main bodies 31*a* and 31*b*. The intake duct 35 is provided in a right side portion of the object-mountable supporting box 84. The exhaust pipe 32a is provided below the supporting box 84. Therefore, the supporting box 84 acts as an intake passage accommodating member for shielding heat from the exhaust pipe 32a. Thus, the temperature of the air supplied to the engine and the temperature of the battery 83 are prevented from being excessively increased by the heat of the exhaust gas in the exhaust pipe 32a.

Since the supporting box 84 acts as the intake passage accommodating member, it is made possible to provide the exhaust pipe 32a at a higher position than the bottom of the body frame 2, i.e., closer to the battery 83 and the intake duct 35, while avoiding the problems caused by the heat as mentioned above. In other words, the exhaust pipe 32a does not need to be located below the body frame 2. Therefore, a sufficient minimum ground clearance can be guaranteed and thus damages to the exhaust system 32 can be avoided even on a rough terrain.

The battery 83 is located on the left side of the all terrain vehicle 1 in the width direction, and the exhaust system 32 is located on the right side. Thus, the heavy components are located on the left and on the right of the center line L. This improves the left-right balance of the all terrain vehicle 1.

The opening 72f of the air introduction duct 72e for introducing air to the air cleaner 71 is open so as to face the front portion 11a' of the bottom plate 11a of the seat 11 at a position close to the front portion 11a', which inclines upward as described above. As a result of such a structure, the air introduction duct 72e is open at a high position below the seat 11, which makes it difficult for rainwater or the like to enter. Therefore, water is unlikely to enter an inner portion of the air cleaner 71 even when the all terrain vehicle 1 is running in the water, and thus the drivability in the water or the like can be improved.

In this all terrain vehicle 1, the battery 83 is located at a higher position than the intake duct 35. Therefore, there is a space above the intake duct 35. The air introduction duct 72e is provided in this space, i.e., on the opposite side from the battery 83, so as to effectively use this space. As a result of such a structure, the height of the seat 11 can be lowered while a sufficient minimum ground clearance is guaranteed.

The table portion 11d is formed at the front end of the front portion 11a' of the seat 11, and the held portions 87e of the forward extension portion 87d of the cover sheet 87 are held between the table portion 11d and the seat receiving portions 31e of the body frame 2. Therefore, the cover sheet 87 can be fixed at a predetermined position with a simple structure. Since the cover sheet 87 is held in the connection portion between the seat 11 and the body frame 2, the cover sheet 87 acts as a cushioning member.

The present invention is not limited to the above-described preferred embodiments, but various variations and modifications may be made without departing from the scope of the present invention. The presently disclosed preferred embodiments are therefore considered in all respects to be illustrative and not restrictive. The scope of the present invention is indicated by the appended claims rather than the foregoing description, and all changes which come within the meaning and range of equivalence thereof are intended to be embraced therein.

What is claimed is:

1. An all terrain vehicle, comprising:
   a body frame including a left frame member and a right frame member extending in a longitudinal direction of the all terrain vehicle;
   a seat mounted on the body frame;
   an engine mounted in a front portion of the body frame;
   a battery and an air cleaner mounted rearward relative to the engine;
   an intake passage arranged to connect the air cleaner and the engine;
   an exhaust passage connected to the engine; and
   an object-mountable supporting box having a bottom plate and bridged between the left frame member and the right frame member; wherein
   the battery is located above the bottom plate of the supporting box;
   the air cleaner is located between the left and right frame members and rearward relative to the supporting box;
   the intake passage is located in an area which is between the left and right frame members, above the bottom plate of the supporting box, and beside the battery in a width direction of the all terrain vehicle; and
   the exhaust passage is arranged so as to pass through an area which is above a bottom of the frame body and below the bottom plate of the supporting box.

2. An all terrain vehicle according to claim 1 wherein the battery is located on one side of the all terrain vehicle in the width direction thereof, and the exhaust passage is located on the other side of the all terrain vehicle opposite from the battery in the width direction.

3. An all terrain vehicle according to claim 1 wherein:
   the seat has a bottom plate having a front portion which extends upward;
   the air cleaner is located below the seat and includes an introduction duct arranged to introduce air to the air cleaner;
   the introduction duct is located between the left and right frame members and on the opposite side from the battery in the width direction; and
   the introduction duct has an introduction opening which is open so as to face the front portion of the bottom plate of the seat at a position close to the front portion.

4. An all terrain vehicle according to claim 3, wherein:
   the bottom plate of the seat includes a table portion at a front end thereof;
   the body frame includes a seat receiving portion arranged to support the table portion;
   the battery is covered with a cover sheet formed of an elastic material;
   the cover sheet includes a front extension portion; and
   the front extension portion is held between the table portion of the bottom plate of the seat and the seat receiving portion of the body frame.

5. An all terrain vehicle according to claim 1 wherein the object-mountable supporting box is made of a resin.

6. An all terrain vehicle according to claim 1, wherein the object-mountable supporting box includes a battery supporting portion and an intake passage accommodating portion.

7. An all terrain vehicle according to claim 6, wherein the battery supporting portion has a box shape which is open at an upper portion thereof and the intake passage accommodating portion has a substantially U-shaped cross-section in the width direction of the all terrain vehicle.

8. An all terrain vehicle according to claim 6, wherein front and rear ends of the intake passage accommodating portion are open.

9. An all terrain vehicle according to claim 1 wherein the object-mountable supporting box includes flanges arranged to be attached to the left and right frame members.

10. An all terrain vehicle according to claim 1 wherein the object-mountable supporting box includes an object-mountable supporting portion arranged to support and hold a starter relay.

11. An all terrain vehicle according to claim 1 wherein the battery is located between the air cleaner and the engine in the longitudinal direction of the all terrain vehicle.

12. An all terrain vehicle according to claim 1, further comprising a cover sheet arranged to cover an opening of the object-mountable supporting box.

13. An all terrain vehicle according to claim 12, wherein the cover sheet includes a battery cover portion arranged to cover a top surface of the battery and an intake duct cover portion arranged to cover a top opening of the intake passage.

14. An all terrain vehicle according to claim 12, wherein the cover sheet includes a projecting portion that is arranged to press and fix the battery to a bottom wall of a battery supporting portion of the object-mountable supporting box.

15. An all terrain vehicle according to claim 1, wherein the battery is located in a left side portion of the object-mountable supporting box, the intake passage is located in a right side portion of the object-mountable supporting box, and an exhaust pipe is connected to the exhaust passage and located below the object-mountable supporting box.

16. An all terrain vehicle according to claim 15, wherein the object-mountable supporting box is arranged to define an intake passage accommodating member that is positioned to shield heat from the exhaust pipe.

17. An all terrain vehicle according to claim 15, wherein the exhaust pipe is located above the body frame.

18. An all terrain vehicle according to claim 1, wherein the battery is positioned higher than the intake passage.

* * * * *